(12) United States Patent
Tseng

(10) Patent No.: US 8,299,957 B2
(45) Date of Patent: Oct. 30, 2012

(54) METHOD FOR DETECTING A VEHICLE TYPE, A VEHICLE SPEED AND WIDTH OF A DETECTING AREA BY A VEHICLE RADAR SENSOR

(75) Inventor: Ming-Te Tseng, HsinChu (TW)

(73) Assignees: Chien Cheng Technology Co., Ltd., Hsin-Chu (TW); Ming-Te Tseng, Hsin-Chu (TW)

( * ) Notice: Subject to any disclaimer, the term of this patent is extended or adjusted under 35 U.S.C. 154(b) by 299 days.

(21) Appl. No.: 12/837,073

(22) Filed: Jul. 15, 2010

(65) Prior Publication Data

US 2011/0227782 A1    Sep. 22, 2011

(30) Foreign Application Priority Data

Mar. 19, 2010 (TW) ............................... 99108142 A

(51) Int. Cl.
*G01S 13/00* (2006.01)
*G01S 13/08* (2006.01)
*G01S 13/58* (2006.01)

(52) U.S. Cl. ............ 342/70; 342/90; 342/104; 342/115; 342/179

(58) Field of Classification Search .............. 342/70–72, 342/90, 104, 114, 115, 179
See application file for complete search history.

(56) References Cited

U.S. PATENT DOCUMENTS

| | | | | |
|---|---|---|---|---|
| 4,117,481 A | * | 9/1978 | Constant | 342/44 |
| 4,317,117 A | * | 2/1982 | Chasek | 342/53 |
| 4,717,915 A | * | 1/1988 | Goede | 342/66 |
| 4,866,438 A | * | 9/1989 | Knisch | 340/936 |
| 5,008,666 A | * | 4/1991 | Gebert et al. | 340/936 |
| 5,087,918 A | * | 2/1992 | May et al. | 342/85 |
| 5,101,200 A | * | 3/1992 | Swett | 340/937 |
| 5,402,346 A | * | 3/1995 | Lion et al. | 701/117 |
| 5,717,390 A | * | 2/1998 | Hasselbring | 340/933 |
| 5,793,491 A | * | 8/1998 | Wangler et al. | 356/613 |
| 5,884,212 A | * | 3/1999 | Lion | 701/117 |
| 5,995,900 A | * | 11/1999 | Hsiao et al. | 701/117 |
| 6,055,042 A | * | 4/2000 | Sarangapani | 356/4.01 |
| 6,195,019 B1 | * | 2/2001 | Nagura | 340/928 |

(Continued)

OTHER PUBLICATIONS

Wang, Bu-Chin, Digital Signal Processing Techniques and Applications in Radar Image Processing, Information and Communication Technology Series, 2008, pp. 161-194, John Wiley & Sons, Inc., Hoboken, New Jersey.

(Continued)

*Primary Examiner* — Jack W Keith
*Assistant Examiner* — Peter Bythrow
(74) *Attorney, Agent, or Firm* — Muncy, Geissler, Olds & Lowe, PLLC

(57) ABSTRACT

A method for detecting a vehicle type, a vehicle speed and width of a detecting area by a vehicle radar sensor is disclosed. A radio wave is transmitted to a tracked vehicle. Subsequently, the reflective radio wave from the vehicle is received. The Doppler frequency versus time distribution is generated from the reflective radio wave. Because the reflective radio wave is influenced by the Doppler Effect, a parallelogram or a shape close to a parallelogram of a consecutive motion diagram is shown in the Doppler frequency versus time distribution of the vehicle. According to the consecutive motion diagram, certain information, such as the length and speed of the tracked vehicle and the width of the detecting area, can be acquired.

10 Claims, 12 Drawing Sheets

U.S. PATENT DOCUMENTS

| | | | |
|---|---|---|---|
| 6,380,884 B1* | 4/2002 | Satou et al. | 342/70 |
| 6,411,889 B1* | 6/2002 | Mizunuma et al. | 701/117 |
| 6,614,536 B1* | 9/2003 | Doemens et al. | 356/601 |
| 6,753,805 B2* | 6/2004 | Nakanishi et al. | 342/128 |
| 6,892,942 B1* | 5/2005 | Widl et al. | 235/384 |
| 6,985,827 B2* | 1/2006 | Williams et al. | 702/142 |
| 7,426,450 B2* | 9/2008 | Arnold et al. | 702/142 |
| 7,768,427 B2* | 8/2010 | Manor | 340/933 |
| 7,920,087 B2* | 4/2011 | Ogawa | 342/70 |
| 8,035,546 B2* | 10/2011 | Nalezinski et al. | 342/28 |
| 8,115,670 B2* | 2/2012 | Klein et al. | 342/107 |
| 2002/0107637 A1* | 8/2002 | Okamura et al. | 701/301 |
| 2003/0142007 A1* | 7/2003 | Ono et al. | 342/70 |
| 2003/0235327 A1* | 12/2003 | Srinivasa | 382/104 |
| 2004/0174294 A1* | 9/2004 | Arnold et al. | 342/104 |
| 2005/0242306 A1* | 11/2005 | Sirota et al. | 250/559.38 |
| 2006/0167633 A1* | 7/2006 | Satonaka et al. | 701/300 |
| 2006/0221229 A1* | 10/2006 | Ogawa et al. | 348/367 |
| 2008/0278365 A1* | 11/2008 | Klein et al. | 342/104 |
| 2009/0040095 A1* | 2/2009 | Ogawa | 342/70 |

OTHER PUBLICATIONS

Richards, Mark A, Ph.D., Fundamentals of Radar Signal Processing, Chapter Two—Signal Models, 2005, pp. 92-97, McGraw-Hill Education, Taiwan.

* cited by examiner

METHOD FOR DETECTING A VEHICLE TYPE, A VEHICLE SPEED AND WIDTH OF A DETECTING AREA BY A VEHICLE RADAR SENSOR

BACKGROUND OF THE INVENTION

1. Field of the Invention

The present invention relates to a method for acquiring the physical information of the vehicle driven on the road, and in particular to a method for detecting a vehicle type, a vehicle speed and width of a detecting area by a vehicle radar sensor.

2. Description of the Related Art

In the prior art, radar technology is ordinarily applied in some professional fields such as car speed detecting, meteorology, and aviation tracking. The radar device of the radar technology comprises a radio wave transmitter that transmits radio waves to trace an object, and a radio wave receiver that gathers reflective radio waves. According to the Doppler Effect, the frequency of the radio wave will become higher than the original frequency when the object approaches the radar device, and the frequency of the radio wave will become lower than the original frequency when the object moves away from the radar device. Therefore, the frequency variations of the reflective signal is analyzed to acquire the object's speed; in other word, when a vehicle moves at a high enough speed to generate the Doppler Effect, the reflective radio wave from the vehicle will generate the Doppler shift. The Doppler frequency versus time variations of the reflective radio wave is recorded and the relative speed of the object and the radar can be computed.

Refer to FIG. 10. It is a simple system that a radar device detects the vehicle speed. The radar device 34 transmits a radio wave that is distributed over a specific area. The vehicle is viewed as an isotropic point target 38 entering into the specific area with a constant speed and reflecting a reflective signal. The radar device catches the reflective signal and utilizes the signal effect of the Doppler Effect to calculate the point speed. Because the equation that describes the relation of the speed of the isotropic point target 38 and the Doppler shift is $$DopShift = \frac{2v}{\lambda}\sin(\phi)$$

Whereas, $\phi$ is an angle 40 shown in FIG. 10 and the angle is changed with the moving point 38. If $\phi$ is very small, $\sin(\phi)$ is closed to the value of $\phi$ which is described as the following equation:

$$\phi = \arctan\left(\frac{vt}{R}\right) \approx \frac{vt}{R}$$

Whereas, t is the time of the point 38 arriving at the vertical location to the radar device, and R is the distance that the point 38 moves at the vertical location to the radar device.

Therefore, $$DopShift \approx \frac{2v^2 t}{\lambda R}$$

i.e.

$$\frac{DopShift}{t} \approx \frac{2v^2}{\lambda R}$$

From the above mentioned equations, it can be known that, if point 38 moves at a constant speed, the Doppler shift versus time is expected to be a linear distribution, as shown in FIG. 11. According to the above technology of the prior art, the frequency of the reflective radar signal is gathered and analyzed to obtain a distribution diagram representing Doppler frequency versus time variations of the object, and then the speed of the object, i.e. the vehicle speed can be known. But, some information, like the vehicle length and the width of the detecting area, cannot be further acquired in the prior art.

Moreover, the above mentioned technology is only useful in a specific situation that the object is far away from the radar device, so it can be viewed as an isotropic point target 38, so it can be viewed as an isotropic reflective object. The vehicle to be detected by the radar device is in a short distance of about tens of meters. However, the vehicle is not an isotropic reflective object, so the distribution is not a straight line 44 in the diagram of the Doppler frequency versus time distribution, but it is a consecutive motion diagram, a parallelogram 42, as shown in the diagram (Refer to FIG. 12). Because the object has volume in the three dimension space, the reflective radio waves are reflected by the whole body, thus the reflective signals form the parallelogram 42 of the distribution. The prior art never further studies any information based on the distribution, and is also not aware of the physical meaning of it. The prior art always searches a line 44 based on the parallelogram of the distribution but the line 44 is not a correct bevel 46 of the parallelogram, as shown in FIG. 12. If the vehicle speed is acquired according to the wrong line, the inaccuracy of the speed could be not stable. In the view of these above mentioned shortcomings of the prior arts, the present invention provides a method to detect the more accurate and stable speed by analyzing the consecutive motion diagram: a parallelogram to acquire an exact vehicle length and an exact width of the detecting area, for the application of the person skilled in the art.

SUMMARY OF THE INVENTION

An objective of the present invention is to disclose a method for detecting a vehicle type, a vehicle speed and width of a detecting area by a vehicle radar sensor. The reflective radio wave can be collected from the vehicle by using the radar technology. Some specific information of the vehicle type, the vehicle speed and the width of the detecting area can be acquired from the data relating to the consecutive motion diagram of the Doppler frequency versus time distribution for the reflective radio wave.

To achieve the above mentioned objectives, the present invention discloses a method for detecting a vehicle type, a vehicle speed and width of a detecting area by a vehicle radar sensor. In the steps of the present invention, the radar device placed at one side of the road sends the radio wave into the road. When the vehicle moves through the detecting area of the road, the reflective radio wave is generated from the vehicle and is received by the radar device. Wherein, the Doppler frequency versus time distribution is a consecutive motion diagram of a parallelogram, and the vehicle length, then the width of the detecting area is calculated to determine the vehicle type.

It is to be understood that both the foregoing general description and the following detailed description are exemplary, and are intended to provide further explanation of the invention as claimed.

DETAILED DESCRIPTION OF THE INVENTION

In general, the radar speed detecting method is based on the Doppler principle. When a radio wave bumps onto a tracked object, the radio wave is reflected, the frequency and the amplitude of the reflective wave are influenced by the moving state of the tracked object. Therefore, if the tracked object is stable in its position, the frequency of the reflective radio wave will not be changed and the Doppler Effect will not be generated. However, if the tracked object moves forward in the transmitted direction of the radio wave, the frequency of the reflective radio wave will be increased; on the other hand, if the object moves oppositely to the propagated direction of the radio wave, the frequency will be decreased. As a result, the effects of the Doppler Shift are produced.

Figure 1:
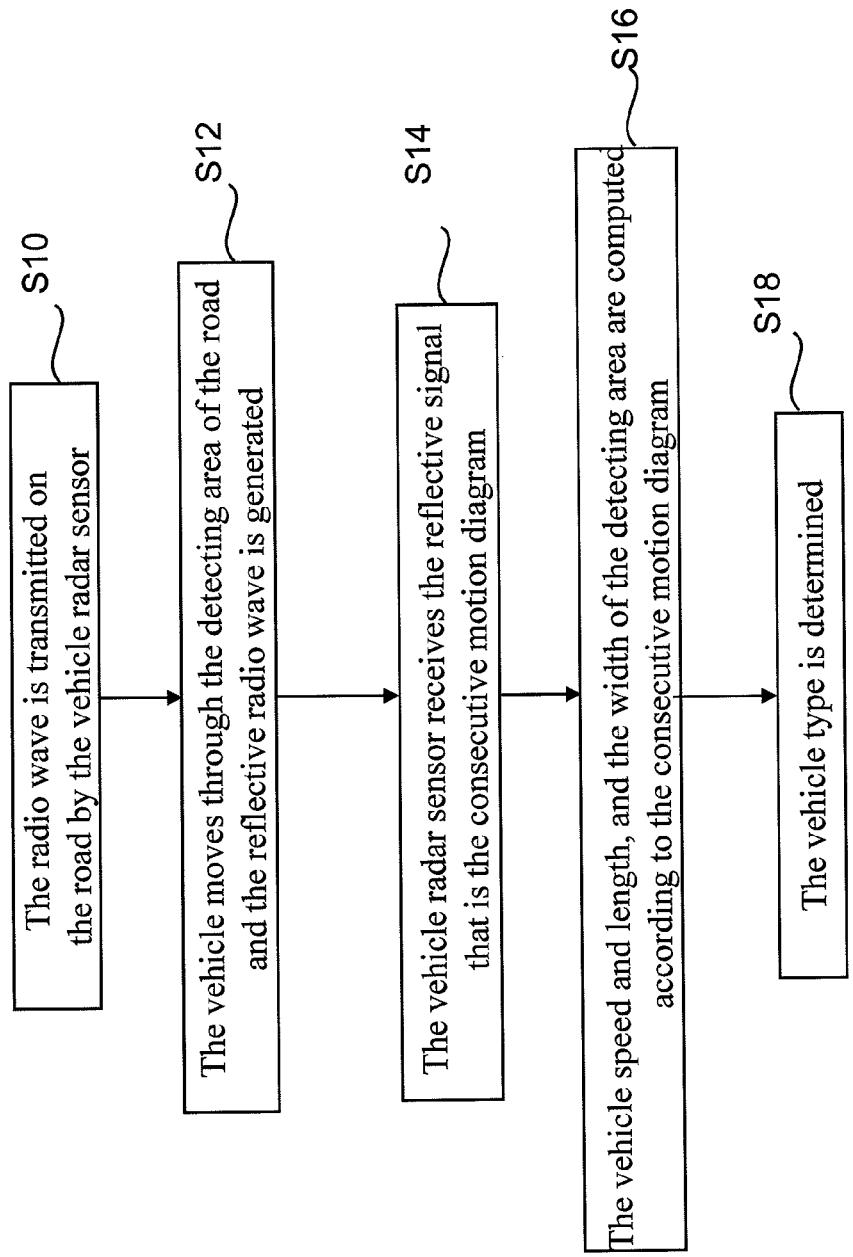
FIG. 1 is a flow chart of the steps of the method according to the preferred embodiment of the present invention.
Figure 2:
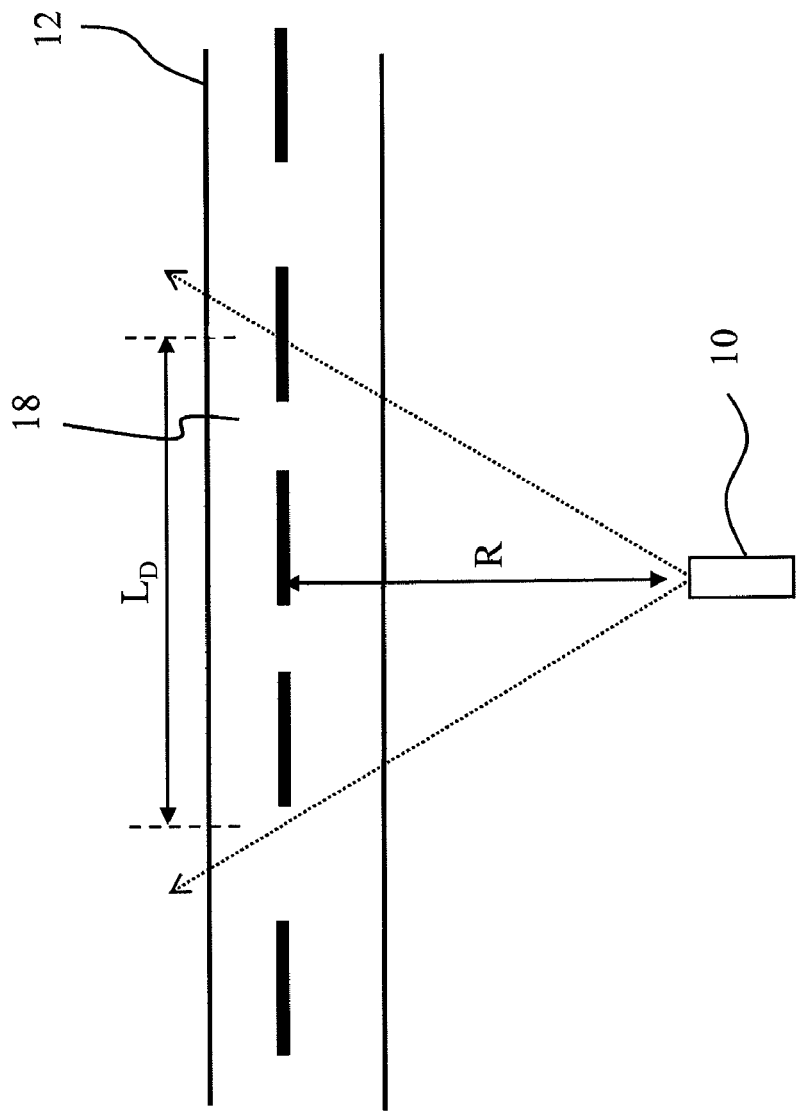
FIG. 2 is a schematic diagram of the radio wave distribution of the road according to the preferred embodiment of the present invention.
Figure 7:
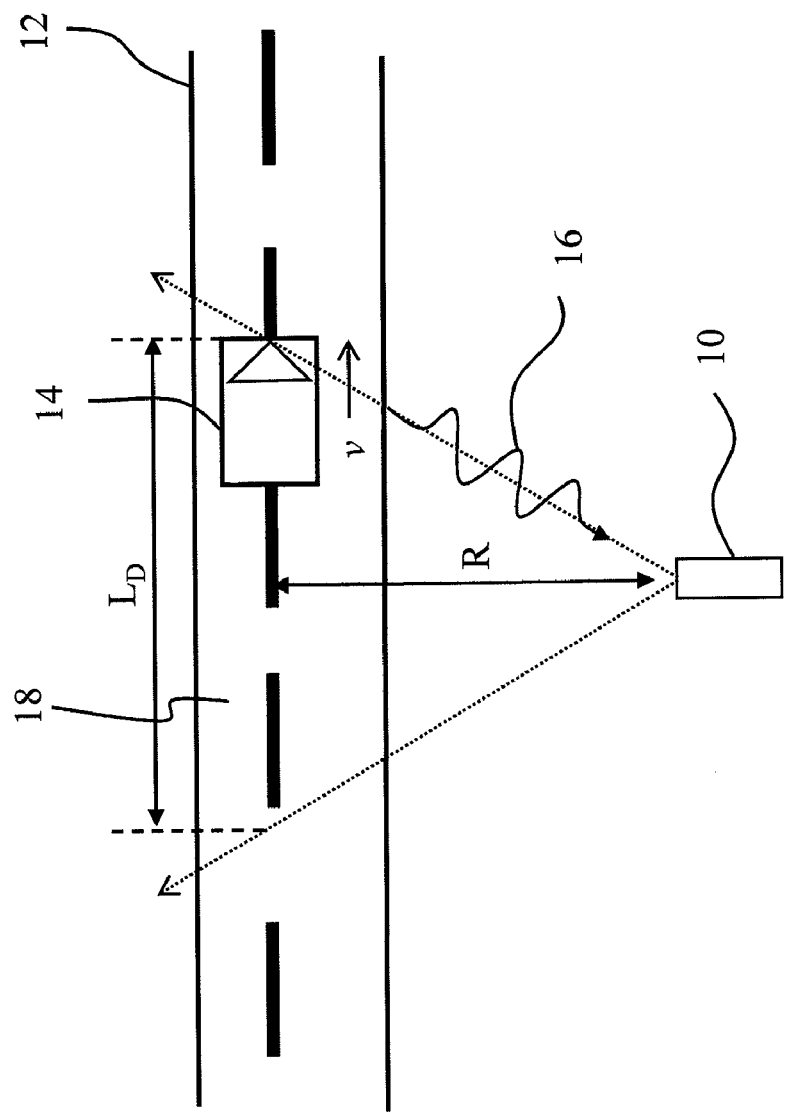
FIG. 7 is a schematic diagram of the front part of the vehicle leaving the radio wave distribution area according to the preferred embodiment of the present invention.
Figure 8:
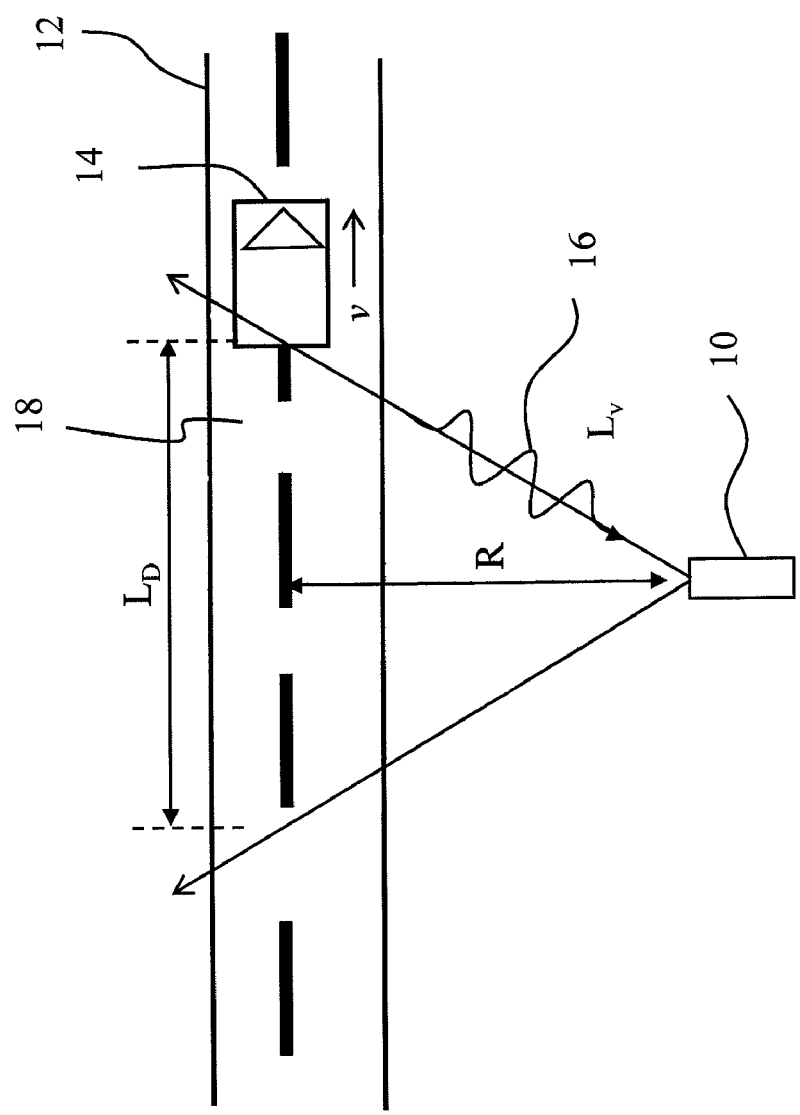
FIG. 8 is a schematic diagram of the rear part of the vehicle leaving the radio wave distribution according to the preferred embodiment of the present invention.

The present invention provides a method for detecting a vehicle type, a vehicle speed and width of a detecting area by a vehicle radar sensor. The Doppler Effect mentioned above is utilized to detect the vehicle length, the vehicle speed and the width of the detecting area. Referring to FIG. 1, in the first step S10 of the present invention, the radar device 10 located on one side of a road transmits a radio wave onto the road 12 to form a radio wave distribution area 18, i.e. a detecting area, as shown in FIG. 2. In the second step S12, the vehicle 14 moves at the constant speed through the radio wave distribution area 18 of the road 12, thus the reflective radio wave 16 is generated. In the second step S12, there are six specific conditions as follows: the front part of the vehicle enters into the radio wave distribution area 18 (FIG. 3), the rear part of the vehicle enters into the radio wave distribution area 18 (FIG. 4), the front part of the vehicle moves at the shortest vertical distance to the vehicle radar sensor (FIG. 5), the rear part of the vehicle moves at the shortest vertical distance to the vehicle radar sensor (FIG. 6), the front part of the vehicle leaves the radio wave distribution area 18 (FIG. 7) and the rear part of the vehicle leaves the radio wave distribution area 18 (FIG. 8). Wherein, the reflective radio wave has the Doppler shift along the propagated direction of the radio wave when the vehicle 14 moves at a speed in a vertical direction to the vehicle radar sensor 10.

Figure 9:
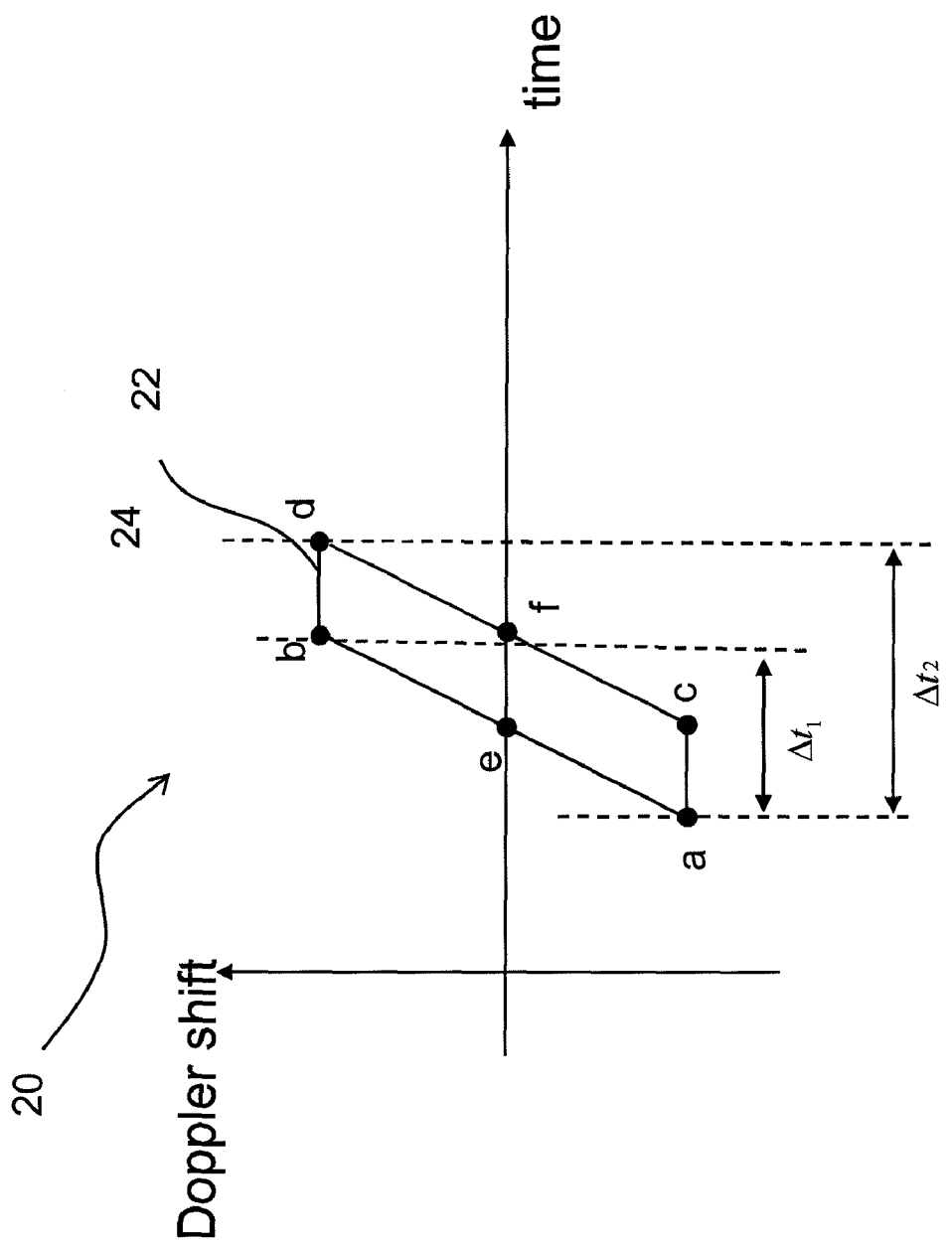
FIG. 9 is a diagram of the Doppler frequency versus time distribution of the reflective radio wave according to the present invention.
Figure 10:
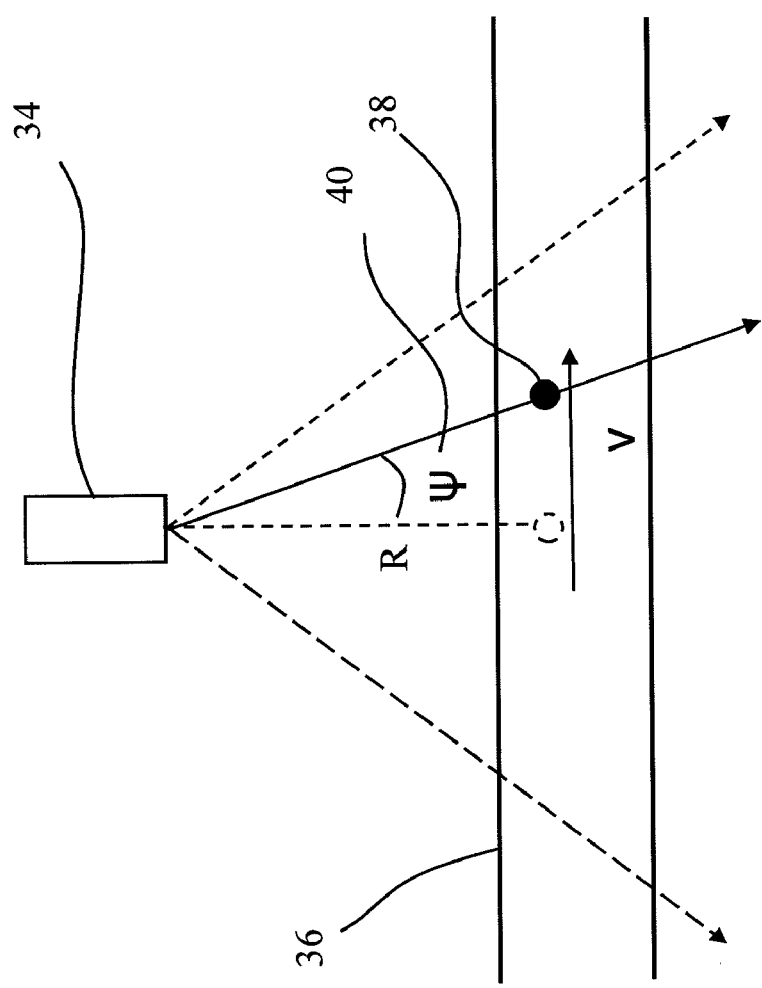
FIG. 10 is a schematic diagram of the speed detecting system of the prior art.
Figure 11:
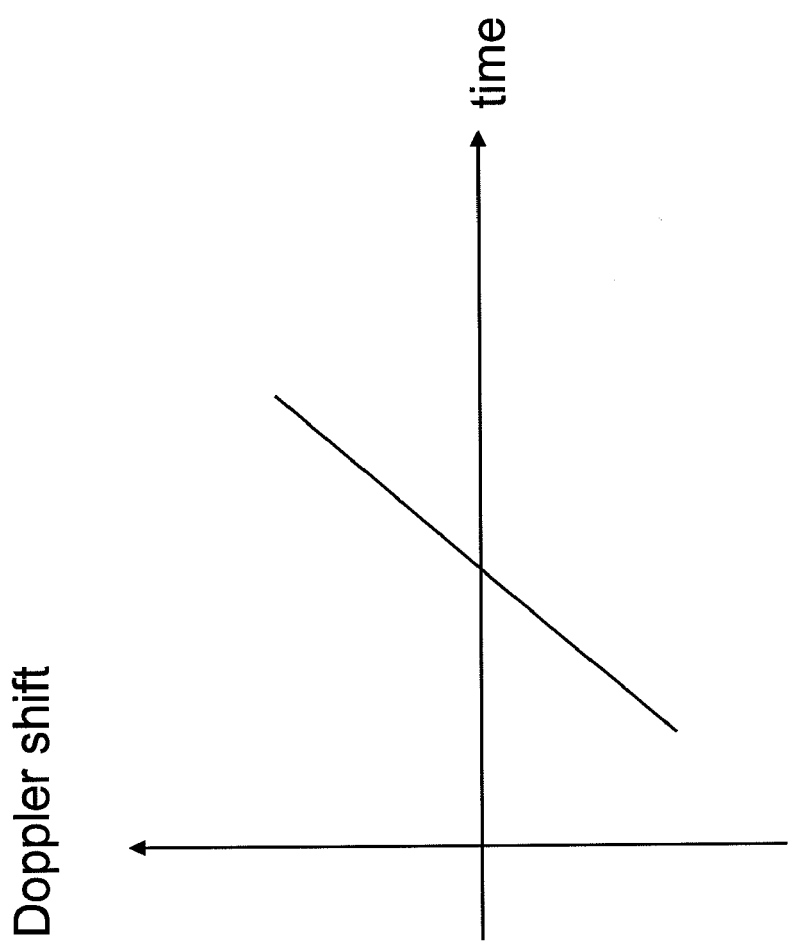
FIG. 11 is a diagram of the Doppler shift versus time distribution of an isotropic point target 38.
Figure 12:
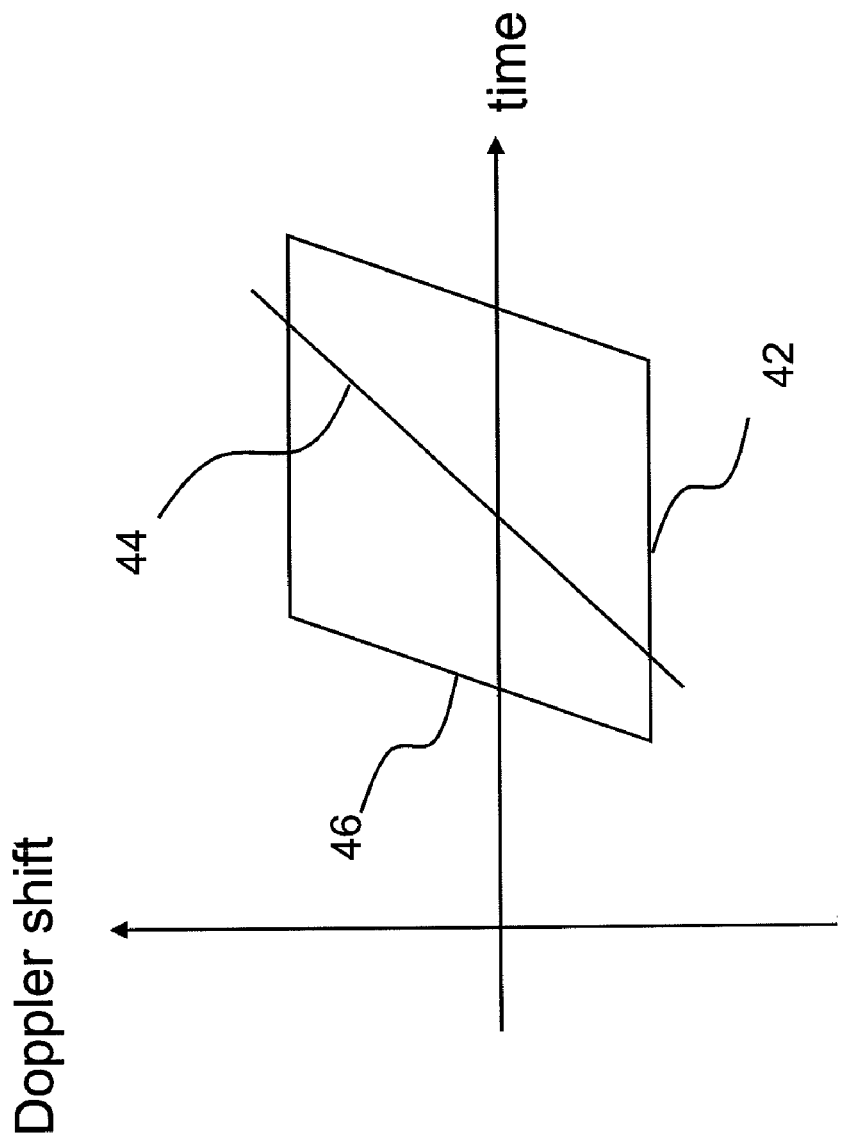
FIG. 12 is a diagram of the Doppler shift versus time of the reflective radio wave collected from the vehicle by the vehicle sensor.

Next, in the third step S14, the vehicle radar sensor gathers the reflective radio wave 16, the reflective radio wave 16 is processed by a computing processor to perform an appropriate filter operation by a window filter and to perform a fast Fourier transform, and then a Doppler frequency versus time distribution 20 of the reflective radio wave signal is acquired. After processing it appropriately, a parallelogram will be generated, as shown in FIG. 9. That is because in an ideal condition of the signals, the reflective signal generated from each point of the vehicle 14 is an oblique line in the frequency versus time distribution 20, and the moving of vehicle 14 can be viewed as a line segment formed by a large number of points. The process of the vehicle passing through the detecting area can be viewed as the process of continuous points on the line entering into and leaving the same area. Each of the points of the line goes in or out of the detecting area will generate an oblique line. Each of the points on the line has the same entering position, leaving position, speed v, distance d and the time spent t, such that as it is known from equation (a), each of the oblique lines has the same slope and the same value of the Doppler shift. In other words, the object points create the oblique lines all having the same slope and the same maximum and minimum of the Doppler shift. These object points with the same slope, the same maximum and minimum of the Doppler shift are combined together to form a parallelogram or a shape close to a parallelogram. Therefore in the frequency versus time distribution 20 a constant distance, the reflective signal generated from the vehicle 14 shows a consecutive motion diagram of a parallelogram 22 or a shape close to a parallelogram, as shown in FIG. 9.

Figure 3:
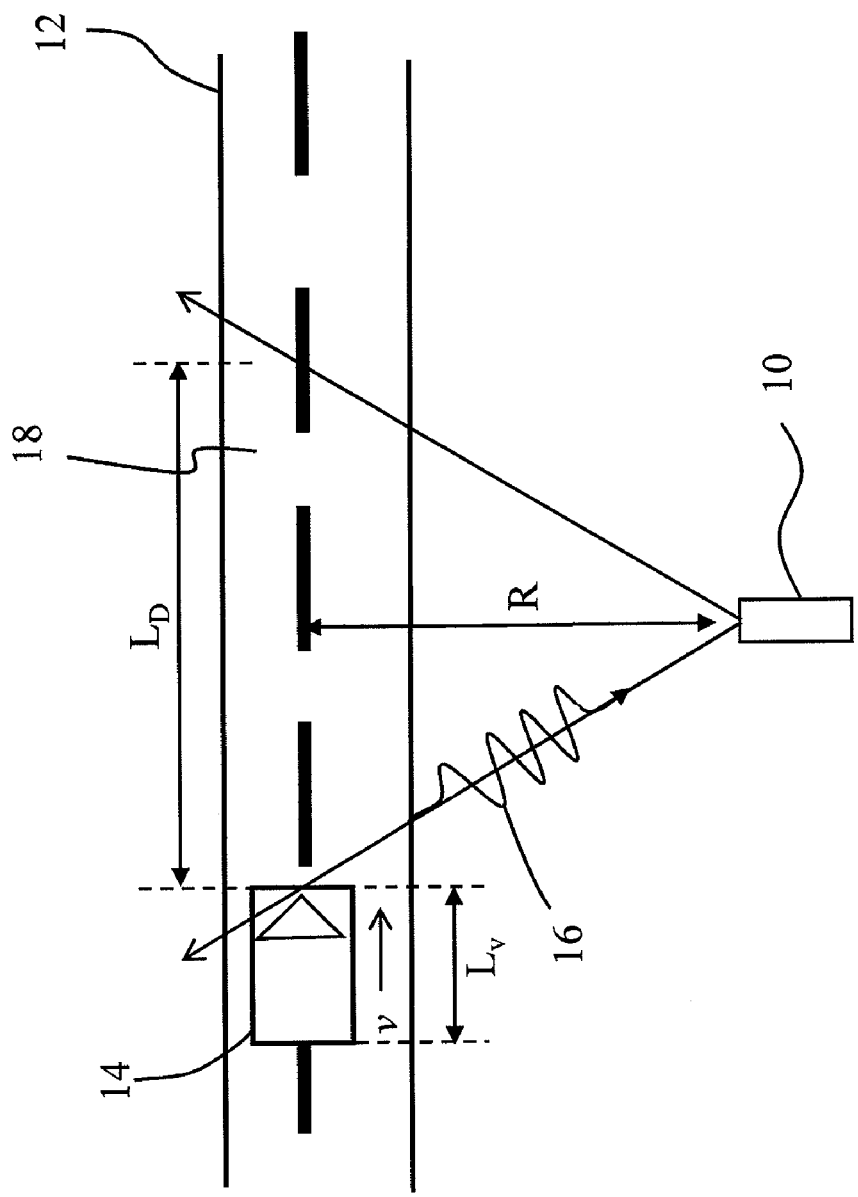
FIG. 3 is a schematic diagram of the front part of the vehicle entering into the radio wave distribution area according to the preferred embodiment of the present invention.
Figure 4:
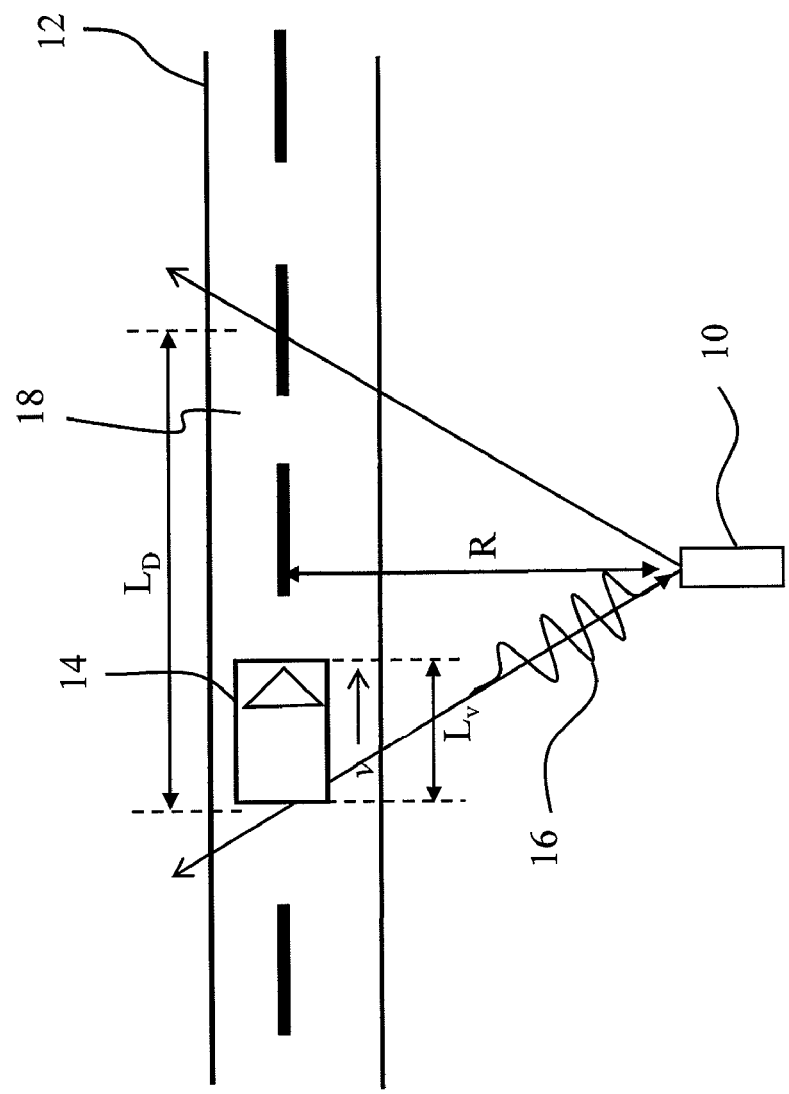
FIG. 4 is a schematic diagram of the rear part of the vehicle entering into the radio wave distribution area according to the preferred embodiment of the present invention.
Figure 5:
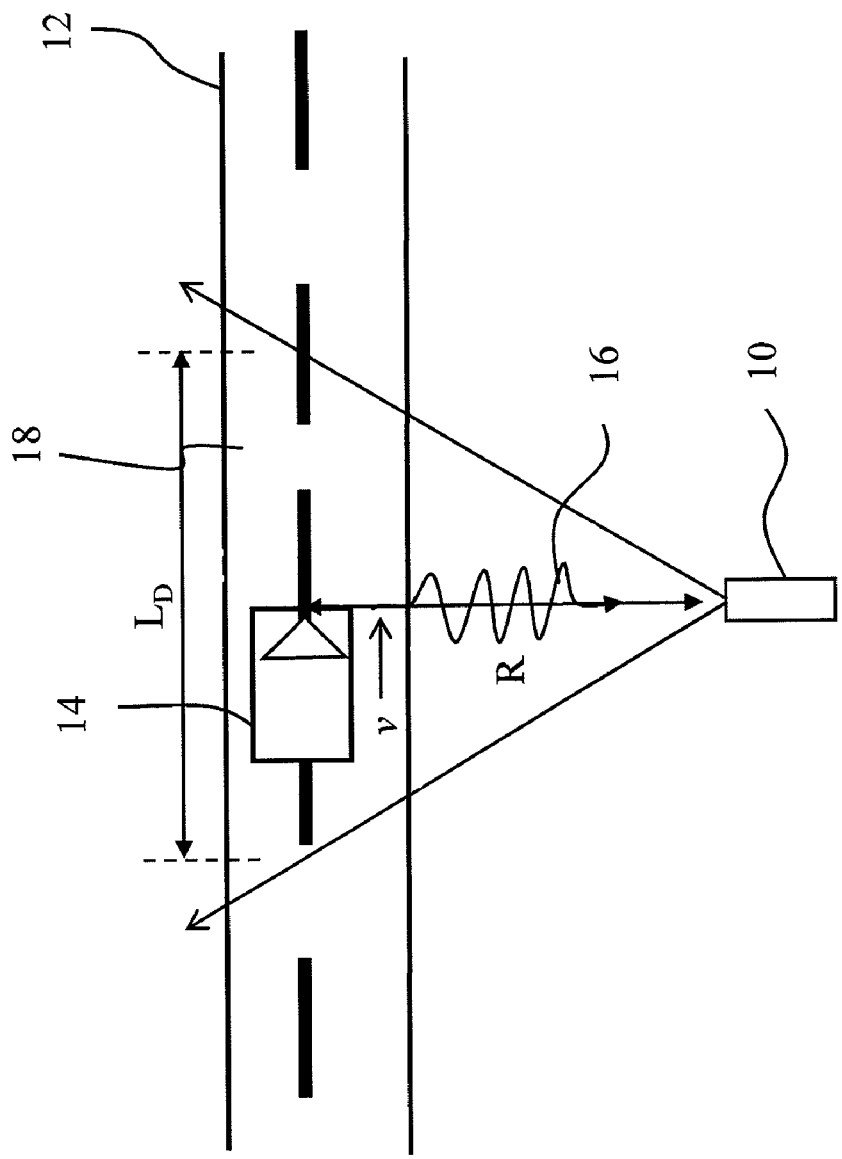
FIG. 5 is a schematic diagram of the front part of the vehicle moving at the shortest distance to the vehicle radar sensor according to the preferred embodiment of the present invention.
Figure 6:
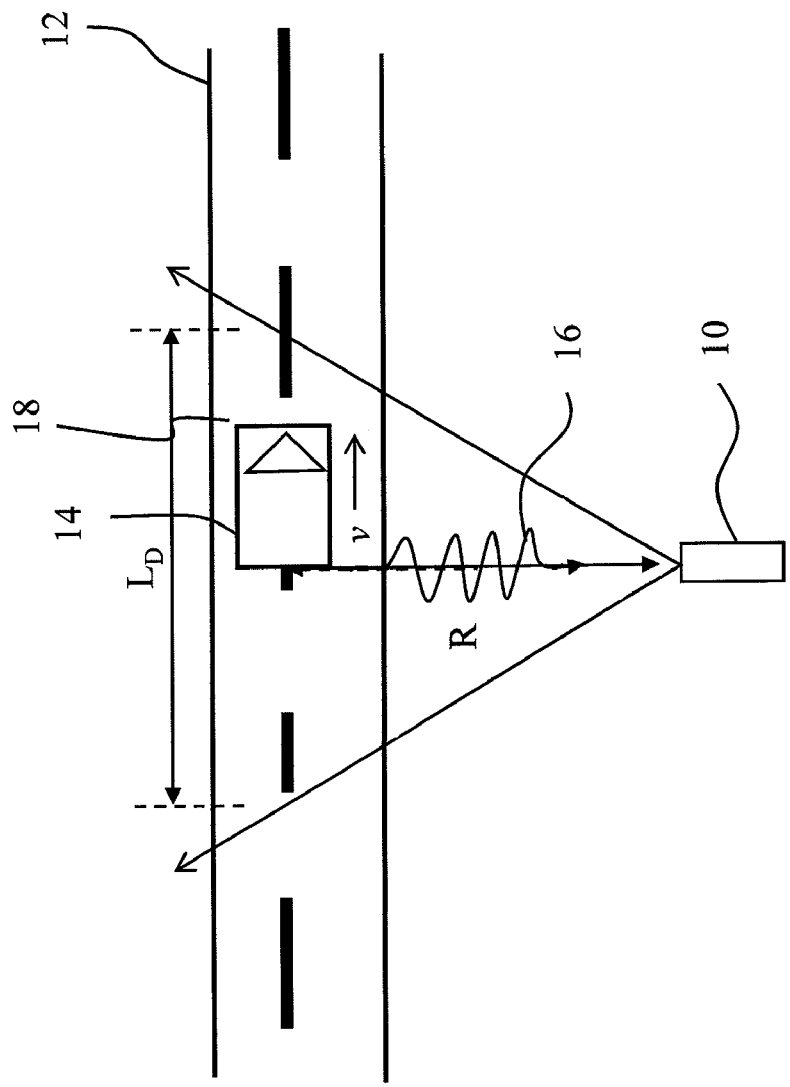
FIG. 6 is a schematic diagram of the rear part of the vehicle moving at the shortest distance to the vehicle radar sensor according to the preferred embodiment of the present invention.

Refer to FIG. 1 and FIG. 9. In the fourth step S16, according to the physical information of the parallelogram 22, the vehicle speed or length can be computed. Firstly, the physical meaning of the apices of the parallelogram 22 and some intersectional points have to be understood in this step. Refer to FIGS. 3-9, wherein the coordinate value of the apex a of the parallelogram 22 in FIG. 9 represents that the time and the Doppler frequency of the reflective radio wave 16 from the front part of the vehicle, when the front part enters into the radio wave distribution area 18 of the road as shown in FIG. 3; the coordinate value of the apex b of the parallelogram 22 in FIG. 9 represents that the time and the Doppler frequency of the reflective radio wave 16 from the front part of the vehicle, when the front part leaves from the radio wave distribution area 18 of the road in as shown in FIG. 7; the coordinate value of the apex c of the parallelogram 22 in FIG. 9 represents that the time and the Doppler frequency of the reflective radio wave 16 from the rear part of the vehicle, when the rear part enters into the radio wave distribution area 18 of the road as shown in FIG. 4; the coordinate value of the apex d of the parallelogram 22 in FIG. 9 represents that the time and the Doppler frequency of the reflective radio wave 16 from the rear part of the vehicle, when the rear part leaves the radio wave distribution area 18 of the road as shown in FIG. 8; the coordinate value of the intersectional point e in FIG. 9 represents the time and the Doppler frequency of the front part of the vehicle moving at the shortest distance to the vehicle radar sensor and the value of the Doppler frequency of the point e is zero, as shown in FIG. 5. The coordinate value of the intersectional point f in FIG. 9 represents the time value and the Doppler frequency value, when the rear part of the vehicle moves at the shortest vertical distance to the vehicle radar sensor. The Doppler frequency of the point f is zero, as shown in FIG. 6.

After understanding the physical meaning of each of the apices of the parallelogram and each of the intersectional points, the correct speed is computed according to the oblique lines. Based on the above mentioned physical meaning, the time difference $\Delta t_1$ of points a, b of the parallelogram 22 represents that the time difference of the front part of the vehicle entering into the radio wave distribution area 18 (i.e. detecting area) and leaving the area. In addition, the Doppler frequency difference $\Delta f$ of points a, b is acquired and the equation of the speed versus frequency of the Doppler Effect is as follows:

$$\Delta f = \frac{2v^2 \Delta t_1}{R\lambda} \tag{1}$$

Wherein, $\lambda$ is the wavelength of the radio wave, and R is the vertical distance from the vehicle radar 10 to the road 12. The vehicle speed v can be acquired according to the equation (2)

$$v = \sqrt{\frac{\Delta f R \lambda}{2\Delta t_1}} \tag{2}$$

Also, suppose the vehicle speed v is constant in the detection area. The distance which is between the front part of the vehicle entering into and the front part leaving is the width $L_D$ of the radio wave distribution on the road. Therefore, $$L_D = \Delta t_1 \times v \tag{3}$$

Equation (2) is substituted into Equation (3). The width $L_D$ of the detecting area is as shown in Equation (4)

$$L_D = \Delta t_1 \times \sqrt{\frac{\Delta f R \lambda}{2\Delta t_1}} = \sqrt{\frac{1}{2}\Delta f \Delta t_1 \times R\lambda} \tag{4}$$

During the computing process mentioned above, $\Delta t_1$, $\Delta F$ of can be also acquired from points c, d as shown in FIG. 9. Finally, $L_D$ can be acquired by the above mentioned calculation, of which the detail will not be mentioned here for brevity.

Then, the time difference $\Delta t_2$ of points a, b of the parallelogram 22 represents the time difference of the front part of the vehicle entering into the radio wave distribution area 18 (i.e. detecting area) and the rear part leaving the area. And the following Equation (5) is utilized to compute the vehicle length $L_v$.

$$L_v = (\Delta t_2 - \Delta t_1)v \tag{5}$$

Moreover, the time difference of points e, f, the time difference of points a, c or the time difference of points b, d can be acquired as shown in FIG. 9. One of the time differences is multiplied by the vehicle speed to obtain the vehicle length $L_v$.

Furthermore, the present invention discloses the other embodiment which utilizes another computing method to obtain the vehicle length or speed. Firstly, Equation (1) describes speed versus frequency of the Doppler Effect as follows.

$$\Delta f = \frac{2v^2 \Delta t_1}{R\lambda} \tag{1}$$

And we can know $$v = \sqrt{\frac{mR\lambda}{2}} \tag{6}$$

Wherein, $$m = \frac{\Delta f}{\Delta t_1},$$

m represents the slope of the oblique side of the parallelogram 22, $\lambda$ is the wavelength of the radio wave, and R is the vertical distance between the vehicle radar sensor 10 and the road 12. Based on the frequency versus time distribution 20 of the reflective signal from the vehicle, as shown in FIG. 9, the slope m of the oblique side of the parallelogram 22 is substituted into Equation (6). The vehicle speed v can be calculated. After acquiring the vehicle speed v, the vehicle length can be acquired according to the equation $L_v = (\Delta t_2 - \Delta t_1)v$. The width of the detecting area is acquired by the equation $L_D = \Delta T_1 v$.

Finally, the type of the vehicle passing through the radio wave distribution area 18 can be determined after figuring out the vehicle length, as shown in the fifth step S18 in FIG. 1.

According to the method for detecting a vehicle type, a vehicle speed and width of a detecting area by a vehicle radar sensor of the present invention, the reflective radio wave gathered is analyzed by utilizing the parallelogram 22 of the Doppler frequency versus time distribution 20 of the reflective radio wave from the vehicle. The vehicle length, the vehicle speed and the width of the detecting area are computed in light of the specific points of the parallelogram 22. Compared with the inaccurate information about the vehicle speed in the radar detecting speed technology of the prior art, the more correct and stable information of the moving vehicle is calculated by the method of the present invention. In addition, the information of the object length and width of a detecting area can be obtained. As a result, the present invention can be applied in the traffic engineering so as to gather the vehicle type statistics on some lanes or roads easily for the engineers and the researchers.

Those described above are only the preferred embodiments to clarify the technical contents and characteristic of the present invention in enabling the persons skilled in the art to understand, make and use the present invention. However, they are not intended to limit the scope of the present invention. Any modification and variation according to the spirit of the present invention can also be included within the scope of the claims of the present invention.

What is claimed is:

1. A method for detecting a vehicle type, a vehicle speed and width of a detecting area by a vehicle radar sensor, comprising steps of:

sending radio waves into said detecting area upon at least one road;

generating at least one reflective signal from said detecting area while a vehicle passing through said detecting area of said road;

generating a Doppler frequency versus time distribution based on said reflective signal, and said distribution is a consecutive motion diagram, said consecutive motion diagram is a parallelogram; and computing said vehicle speed, said vehicle length and said width of said detecting area according to said consecutive motion diagram.

2. The method for detecting a vehicle type, a vehicle speed and width of a detecting area by a vehicle radar sensor according to claim 1, further comprising a step of:

determining said vehicle type according to said vehicle length.

3. The method for detecting a vehicle type, a vehicle speed and width of a detecting area by a vehicle radar sensor according to claim 1, wherein four apices of said parallelogram have four time values and Doppler frequency differences among said four apices that represent a front part of said vehicle enters into said detecting area, a front part of said vehicle leaves said detecting area, a rear part of said vehicle enters into said detecting area or said rear part of said vehicle leaves said detecting area.

4. The method for detecting a vehicle type, a vehicle speed and width of a detecting area by a vehicle radar sensor according to claim 3, wherein in said step of computing said vehicle speed, said vehicle length and said width of said detecting area according to said consecutive motion diagram, a Doppler Effect equation $$\Delta f = \frac{2v^2 \Delta t}{R\lambda}$$

is used to compute said vehicle speed v, whereas $\Delta t$ is time difference between said rear part of said vehicle entering into and leaving said detecting area; $\Delta f$ is frequency difference between said rear part of said vehicle entering into and leaving said detecting area; $\lambda$ is a wavelength of said radio wave; R is a vertical distance between said vehicle radar sensor and said road.

5. The method for detecting a vehicle type, a vehicle speed and width of a detecting area by a vehicle radar sensor according to claim 3, wherein in said step of computing said vehicle speed, said vehicle length and said width of said detecting area according to said consecutive motion diagram, said vehicle speed and a time difference between said rear part of said vehicle entering into and leaving said detecting area are utilized to compute said width of said detecting area.

6. The method for detecting a vehicle type, a vehicle speed and width of a detecting area by a vehicle radar sensor according to claim 3, wherein in said step of computing said vehicle speed, said vehicle length and said width of said detecting area according to said consecutive motion diagram, a Doppler Effect equation $$\Delta f = \frac{2v^2 \Delta t}{R\lambda}$$

is used to compute said vehicle speed v, whereas $\Delta t$ is time difference between said front part of said vehicle entering into and leaving said detecting area; $\Delta f$ is frequency difference between said front part of said vehicle entering into and leaving said detecting area; $\lambda$ is a wavelength of said radio wave; R is a vertical distance between said vehicle radar sensor and said road.

7. The method for detecting a vehicle type, a vehicle speed and width of a detecting area by a vehicle radar sensor according to claim 3, wherein in said step of computing said vehicle speed, said vehicle length and said width of said detecting area according to said consecutive motion diagram, said vehicle speed and said time difference between said front part of said vehicle entering into and leaving said detecting area are utilized to compute said width of said detecting area.

8. The method for detecting a vehicle type, a vehicle speed and width of a detecting area by a vehicle radar sensor according to claim 3, wherein said vehicle speed and said time difference, which is between said front part of said vehicle entering into said detecting area and said rear part of said vehicle entering into said detecting area or between said front part of said vehicle leaving said detecting area and said rear part of said vehicle leaving said detecting area, are utilized to compute said vehicle length.

9. The method for detecting a vehicle type, a vehicle speed and width of a detecting area by a vehicle radar sensor according to claim 1, wherein two points intersected by said parallelogram with a Doppler frequency zero axis have two time values that said front part of said vehicle at a shortest distance to said vehicle radar sensor and said rear part of said vehicle at a shortest distance to said vehicle radar sensor and a Doppler frequency difference between said points.

10. The method for detecting a vehicle type, a vehicle speed and width of a detecting area by a vehicle radar sensor according to claim 9, wherein said vehicle length is computed according to said vehicle speed, and said time difference of said time values that said front part of said vehicle at a shortest distance to said vehicle radar sensor and said rear part of said vehicle at a shortest distance to said vehicle radar sensor.

* * * * *